Nov. 18, 1930.  I. D. FORD  1,782,165

SECURING MEANS

Filed June 11, 1928

Inventor
Ira D. Ford

By Emery, Booth, Janney & Varney Attys.

Patented Nov. 18, 1930

1,782,165

UNITED STATES PATENT OFFICE

IRA D. FORD, OF ROSELAND, ONTARIO, CANADA, ASSIGNOR TO UNIVERSAL BUTTON FASTENING & BUTTON COMPANY, OF DETROIT, MICHIGAN, A CORPORATION OF MICHIGAN

SECURING MEANS

Application filed June 11, 1928. Serial No. 284,314.

This invention relates to snap fastener securing means and aims to provide an improved snap fastener means for detachably securing pieces of cloth together.

The invention may be readily understood by reference to one illustrative embodiment thereof shown in the accompanying drawing.

Figure 1:
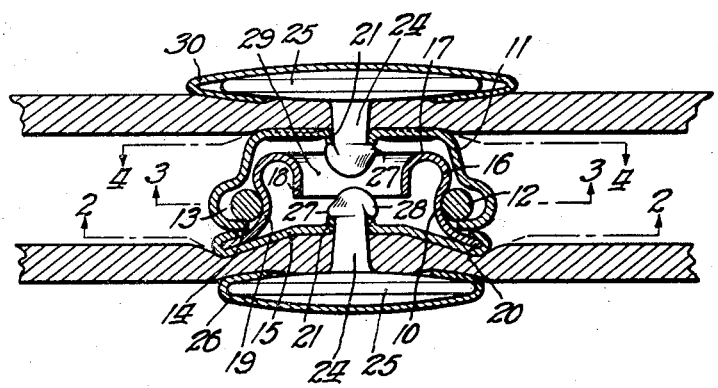
Fig. 1 is an enlarged section through the elements of a closed snap fastener secured to overlapping pieces of fabric.
Figure 2:
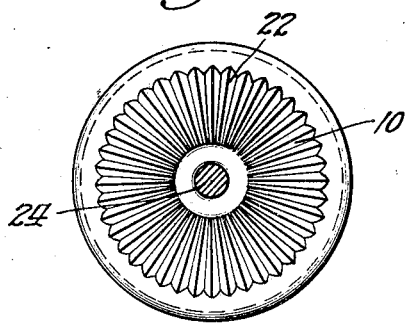
Fig. 2 is a bottom plan view of the stud element of the fastener taken along the line 2—2 of Fig. 1.
Figure 3:
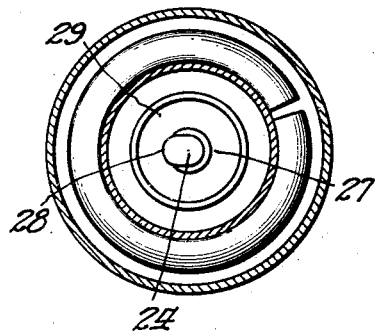
Fig. 3 is a plan section through the closed fastener elements taken along the line 3—3 of Fig. 1.
Figure 4:
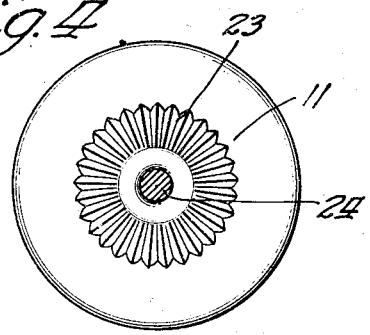
Fig. 4 is a plan view of the base of the socket element of the snap fastener taken along the line 4—4 of Fig. 1.

Because of the facility of their application and because they eliminate the need for expensive button holes, snap fasteners are advantageous for fastening together overlapped pieces of cloth or the like, particularly in working clothing and other articles where ease in fastening or unfastening is important or where fastening by buttons or hooks is unsuitable or expensive. However, the strain which is placed on the cloth to separate the snap fastener elements (which have adequate separation resistance for articles of clothing of this character) frequently results in tearing of the cloth at the points of attachment, due to weaknesses created by severing of the threads by the attaching means and to inadequate gripping of the cloth by the attaching elements. Snap fasteners have, therefore, been objectionable notwithstanding their inherent advantages, except for unusually strong materials, such as leather.

The illustrative snap fastener is herein represented by inter-fitting stud and socket elements 10 and 11 which may be separably held together through the action of a resilient element in the form of a spring ring 12 carried by the socket element. The latter element consists of a cup-shaped member advantageously pressed from sheet metal and having an interior groove 13 adjacent the rim 14 of the cup in which is loosely held the spring ring 12, which in this instance extends almost, but not quite, around the circumference of the groove.

The stud element 10 comprises in this instance a circular base 15 and a projecting stud 16 of less diameter than the base. The head 17 of the stud is rounded in this instance by beading or curling inwardly the free edge 18 of the metal forming a stiffening flange, and formed to an external diameter slightly greater than the normal or unstrained internal diameter of the spring ring 12. The depth of the stud is sufficient to permit the head thereof to pass the spring ring of the socket element into which it is snapped, the spring ring fitting underneath the head around the reduced neck 19 of the stud. The groove 13 in the socket is made sufficiently larger than the normal diameter of the ring to allow room for necessary expansion of the ring in passing over the larger stud head.

The spring strength of the spring ring 12 and shape and diameter of the stud head 17 and neck 19 are designed to cause the snap fastener parts to offer appropriate resistance to separation. Where the fastener is designed to hold together portion of a cloth garment, for example, the resistance to separation of the stud and socket must be at least great enough to withstand the tension (which is sometimes relatively large) exerted in the normal use of the garment.

The base 15 of the stud element is advantageously formed in a separate piece and attached to the stud proper by crimping its flange over the projecting flange 20 at the base of the stud.

The bases of the stud and socket elements are formed to present substantial cloth engaging faces and pierced centrally by a tool which curls up the metal around the margin of the pierced hole, as at 21, thereby substantially stiffening the bases of the element. The bases of the respective elements are further reinforced by a series of radial corrugations 22 and 23, respectively, covering substantially the surface of the base and serving to prevent distortion thereof (and possible loosening of the fastener element) by the attaching forces. The base of the stud element is arched inwardly to cooperate with the radial corrugations therein in sustaining the attaching forces and transmitting the gripping forces from the center of the base outwardly to its rim.

The attaching element is herein represented by a headed, single prong tack or fastener whose prong 24 is sharply pointed and pierces the cloth without weakening or severing any part thereof, and is upset within the fastener element under pressure so that the fabric is clamped firmly between the head of the tack and the base of the snap fastener element. In the illustrative fastener the head 25 is integral with the prong 24 and is advantageously finished (and enlarged if need be to provide a head of sufficient diameter) by a cap 26 whose margins are crimped or upset under the head. The tack is made of metal sufficiently ductile and malleable that it may be formed in a tack machine so that the prong of the tack will enlarge and upset properly inside the snap fastener under the action of the upsetting die.

The opening in the base of each of the respective snap fastener elements is preferably slightly smaller than that portion of the prong with which it comes into permanent engagement. In the attaching operation, the prong of the tack, therefore, enlarges the hole in the base, thereby insuring a tight engagement of the base about the prong. This tight fit together with the tapered shape of the prong assists in limiting the upsetting of the prong to the free portion thereof lying inside the base of the snap fastener element. The character of the metal of which the prong is made is such that under the upsetting action of the die it slightly enlarges or expands in diameter at 27 just inside the opening in the base, thereby resisting separation from the fastener element throughout the circumference of the prong. The extremity of the prong may advantageously be bent or curled over as at 28 against the base of the fastener element, thus providing additional security against separation or loosening of the grip on the cloth.

The tension thus created in the fastener prongs by the attaching operation is sufficient to cause the bases of stud and socket elements and the cooperating attaching fastener heads tightly to grip and compress the fabric between them. In the drawing the piece of fabric is shown thus compressed; but the degree of compression necessary to effect an efficient grip obviously depends somewhat on the character and thickness of the fabric or layers of fabric to which the snap fastener element is secured. This grip is augmented by the corrugations in the bases of the snap fastener elements and should be firm enough to contribute substantially to securing the fastener element in place and should be adequate to withstand the usual pull upon the cloth (which with some snap fasteners may be relatively strong) necessary to separate the fastener elements, so that in the ordinary case the tendency to displace or shift the fabric between the gripping head and base is effectively resisted. In this connection it should be noted that both the socket and stud elements are designed so that their central portions 29 are open and accessible to an upsetting tool.

For purposes of decoration or adjustment the outer or top attaching fastener is advantageously provided with a head larger than that necessary merely for attaching purposes. This head includes a finishing cap 30 (the margins of which are crimped underneath the tack head) which may be decorated or designed for advertising purposes, or both, by appropriate plating and embossing.

The piercing of the fabric by the attaching prongs 24 not only preserves the integrity of the fabric but avoids any wrinkling thereof, leaving a smooth surface to be gripped. Since its integrity is preserved, the fabric cannot readily slip or move between the gripping heads; and the prongs themselves resist any tendency to slip. It is, therefore, difficult, if not impossible, for the fabric to be slit in separating the snap fastener elements.

The qualities above pointed out make available the use of the snap fastener principle in those forms of clothing wherein it is particularly advantageous, such as children's rompers and working-men's clothing. I have found that through the elimination of expensive button holes, four garment handlings may be eliminated in the course of manufacture. This is a very important item in the cost of manufacture because clothing is of a character which makes it particularly difficult and expensive to handle in passing it through the various manufacturing operations.

In addition to the direct benefits to the garment manufacturer, the advantages in use of the improved snap fastener are substantial. I have discovered that the combined securing action of spaced piercing prongs and the clamping or gripping action above referred to provide a very great factor of safety in firmness and durability of attachment, particularly as compared to the force necessary to separate the fastener elements. The firmness and security of fastening enables one to derive full benefit of the fastening characteristics of the snap fastener. They may not only be quickly and easily snapped together (by one hand if necessary) but by a single pull applied at an appropriate portion of the garment an entire line of fasteners may be separated, with the assurance that the cloth will not be weakened or torn and that the fasteners will remain securely attached during the useful life of the garment.

Obviously the invention is not limited to the details of the illustrative construction, since these may be variously modified. Moreover, it is not indispensable that all features of the invention be used conjointly, since various features may be used in different combinations and sub-combinations.

Having described one embodiment of my invention, I claim:

1. A snap fastener structure comprising in combination a snap fastener element having a cloth engaging base pierced to provide an attaching opening, the metal displaced to provide said opening being curled inwardly to provide an up-standing marginal flange around said opening, said base being corrugated to reinforce the same, and an attaching fastener having a head and a single pointed prong, said head and base being of a size to present substantial cloth engaging faces, said prong piercing the cloth without severing any part thereof and being upset under pressure inside said element so as to engage the edge of said opening and causing said head and base tightly to grip opposite sides of the cloth.

2. Cloth fabric securing means comprising in combination a pair of separable snap fastener elements each provided with a cloth engaging base, each of said bases being pierced to provide an opening, the metal displaced to form said opening being curled inwardly to provide an upstanding marginal flange around said opening, said bases being provided with radial corrugations to reinforce the same, and a headed fastener for each of said elements having a single pointed prong piercing the fabric without severing any part thereof and being upset under pressure inside its snap fastener element and expanded so as to engage said marginal flange, said upset prong causing said fastener head and snap fastener base to grip the fabric tightly between them.

3. In combination, snap fastener elements having cooperating interlocking parts, one of said parts having a cloth engaging base portion provided with an opening, means for reinforcing said base portion including ribs pressed from said base and extending radially outwardly from said opening, and an attaching fastener having a head and a single pointed prong adapted to pierce the cloth and extend through the opening aforesaid.

4. A snap fastener structure including two spaced cloth engaging members of substantially uniform area, one being a base and the other a cap, said base having an open return bent flange, attaching means for said members including a headed and single prong fastener having the head thereof secured to and concealed by said cap and having the single prong thereof extending through said base, the pointed end of said prong being upset after entering the base, and a headed and flanged stud element having the flange thereof received in and held by the open return bent flange of the base and having a tubular head provided with an inturned annular flange substantially concentric with the upset pointed end of the single prong aforesaid.

5. A snap fastener structure including two spaced cloth engaging members, one being a base, and the other a cap, each of said members having marginal open return bent flanges, a headed and flanged stud element having the flange thereof received in and held by the open return bent flange of said base, the head of said element being circular and having an inwardly extending annular stiffening flange, and attaching means for said members including a headed and single pronged fastener having the head thereof received in and held by the open return bent flange of the cap and having the single prong thereof extending through said base, the pointed end of said prong being upset after entering the base and being received in the opening in the head formed by the inwardly extending annular stiffening flange.

6. A snap fastener structure including two spaced cloth engaging members, one being a base, a headed and flanged stud element having the flange thereof secured to said base, the head of said element being circular and having an inwardly extending annular stiffening flange, and attaching means for said members including a single pointed prong projecting from the other of said members and extending through said base, the pointed end of said prong being upset after entering the base and being adjacent the annular stiffening flange aforesaid.

In testimony whereof, I have signed my name to this specification.

IRA D. FORD.